ns. Jan. 13, 1953                                                                                                                    2,625,563

UNITED STATES PATENT OFFICE 2,625,563

2-ETHYL BUTYRIC ACID AND 2-ETHYL HEXOIC ACID ESTERS OF 2,2,4-TRIMETHYL PENTANE DIOL-1,3

Alan Bell, Kingsport, Tenn., assignor to Eastman Kodak Company, Rochester, N. Y., a corporation of New Jersey No Drawing. Original application February 16, 1949, Serial No. 76,849. Divided and this application February 1, 1952, Serial No. 269,611

4 Claims. (Cl. 260—488)

This invention relates to the 2-ethyl butyric acid esters and the 2-ethyl hexoic acid esters of 2,2,4-trimethyl pentane diol-1,3 and their preparation. This application is a division of U. S. application Serial No. 76,849, filed February 16, 1949, now Patent Number 2,592,234.

Many esters which superficially appear to be of the type which would be useful for plasticizing cellulose esters when actually tested suffer from various disadvantages. For instance, some esters do not exhibit good compatibility with some types of cellulose derivatives. Other esters, although compatible, have physical characteristics which preclude their use in cellulose ester compositions, such as instability, proneness to water susceptibility, low vapor pressure, and the like. I have found that the ethyl butyric or ethyl hexoic acid esters of 2,2,4-trimethyl pentane diol-1,3 are esters having good characteristics so as to be adapted for plasticizing cellulose derivatives, particularly those having a high propionyl or high butyryl content. I have found that these esters may be prepared in high yields and that these esters have low vapor pressures, are readily compatible with various cellulose derivatives, and are resistant to an appreciable degree to the action of moisture thereon and on cellulose derivative compositions in which those materials are used as plasticizers.

The esters in accordance with my invention are prepared by reacting 2,2,4-trimethyl pentane diol-1,3 with either the acids listed or the anhydrides thereof. Although a catalyst such as sulfuric acid may be present in the esterification mass, I have found that the reaction goes well without any added catalyst merely by heating together the diol and the acid for a time.

The following examples illustrate the preparation of esters in accordance with my invention:

*Example 1.*—438 parts of 2,2,4-trimethyl pentane diol-1,3 was mixed with 870 parts of 2-ethyl butyric acid and the mixture was heated in a chamber equipped with an agitator, thermometer, and decanting reflux condenser. The temperature was maintained at 200–210° C. for forty-eight hours, at the end of which time 100 parts of water had been collected from the action of the decanting reflux condenser. The resulting crude product was washed with dilute aqueous sodium carbonate, then washed with water, then dried over sodium sulfate and vacuum distilled. The resulting product was found to have a boiling point of 145–148° C. at 2 mm. pressure. A yield of 60% of the diester of 2-ethyl butyric acid and the diol was obtained.

*Example 2.*—438 parts of 2,2,4-trimethyl pentane diol-1,3 and 1080 parts of 2-ethyl hexoic acid were mixed together and heated in a chamber provided with a decanting reflux condenser as described in the preceding example, the heating being carried out for twenty-four hours at 220–230° C. The crude product was washed with dilute sodium carbonate and then with water and dried over sodium sulfate, and a product was obtained having a boiling point of 70–75° C. at 1–2 microns. 491 parts of product was obtained giving a yield of 42%. The product was the diester of 2-ethyl hexoic acid and the diol.

It was found that when these esters were used as plasticizers in cellulose esters having high propionyl and high butyryl content, particularly esters having a propionyl or butyryl content of at least 30% that products were obtained having a good flow and were resistant to the effect of water. For instance, when the 2-ethyl butyric ester of the diol was mixed with a cellulose acetate butyrate having a 38% butyryl content, the proportion of 20 parts of plasticizer per 100 parts of cellulose ester, that a product was obtained having a flow temperature of 312° F., and the product obtained from this composition had a modulus of elasticity of 1.40, upon immersion in water showed a gain of only 1.72 and a leaching of only 0.02, and upon heating a loss of only 0.16. It is to be understood, however, that this material is compatible in various proportions with the various cellulose esters having high propionyl or butyryl content. When this material was mixed with cellulose acetate propionate having a propionyl content of 45% in the proportion of 20 parts of the ethyl butyric acid ester of the diol per 100 parts of the cellulose ester, that a composition was obtained having a flow temperature of 312° F., and the product obtained by forming this composition had a modulus of elasticity of 1.19, a gain in weight upon immersion of only 1.68, and a loss by leaching of only 0.02. Upon heating the loss was only 0.31. The 2-ethyl hexoic esters also show similar good properties. For instance, when 20 parts of the ethyl hexoic ester of the diol was mixed with 100 parts of cellulose acetate butyrate having a butyryl content of 38%, a composition was obtained having a flow temperature of 305° F., and the product obtained from such a composition had a modulus of elasticity of 1.12, a gain on immersion of 1.34, a loss by leaching of only 0.04 and on heating of only 0.46. These compositions did not exhibit any fumes or odor upon heating, and the products prepared therefrom exhibit a good appearance and are free of cloudiness or opaqueness. Thus, it may be seen that the permanence properties of the compositions prepared with the esters described herein and high butyryl or high propionyl cellulose esters are good and compare favorably with plastics of the best permanence known at the present time. These esters are resinous material and, therefore, also appear to be useful in the formulating of various coating compositions to be applied to a surface from a volatile solvent.

It is desirable in preparing the esters in accordance with my invention that the acid be employed in a sufficient amount to completely esterify both of the hydroxyls of the diol together with a small excess of the acid. The proportion of acid employed as related to the diol used can be varied, however, within 10% of the theoretical in either direction without departing from the invention which I have described herein.

I claim:
1. An ester selected from the group consisting of di-2-ethyl butyric acid esters and the di-2-ethyl hexoic acid esters of 2,2,4-trimethyl pentane diol-1,3.
2. The di-2-ethyl butyric acid ester of 2,2,4-trimethyl pentane diol-1,3.
3. The di-2-ethyl hexoic acid ester of 2,2,4-trimethyl pentane diol-1,3.
4. A method of preparing esters of 2,2,4-trimethyl pentane diol-1,3 which comprises heating therewith a compound selected from the group consisting of acids and anhydrides of 2-ethyl butyric acid and 2-ethyl hexoic acid.

ALAN BELL.

No references cited.